United States Patent Office 3,279,016
Patented Oct. 18, 1966

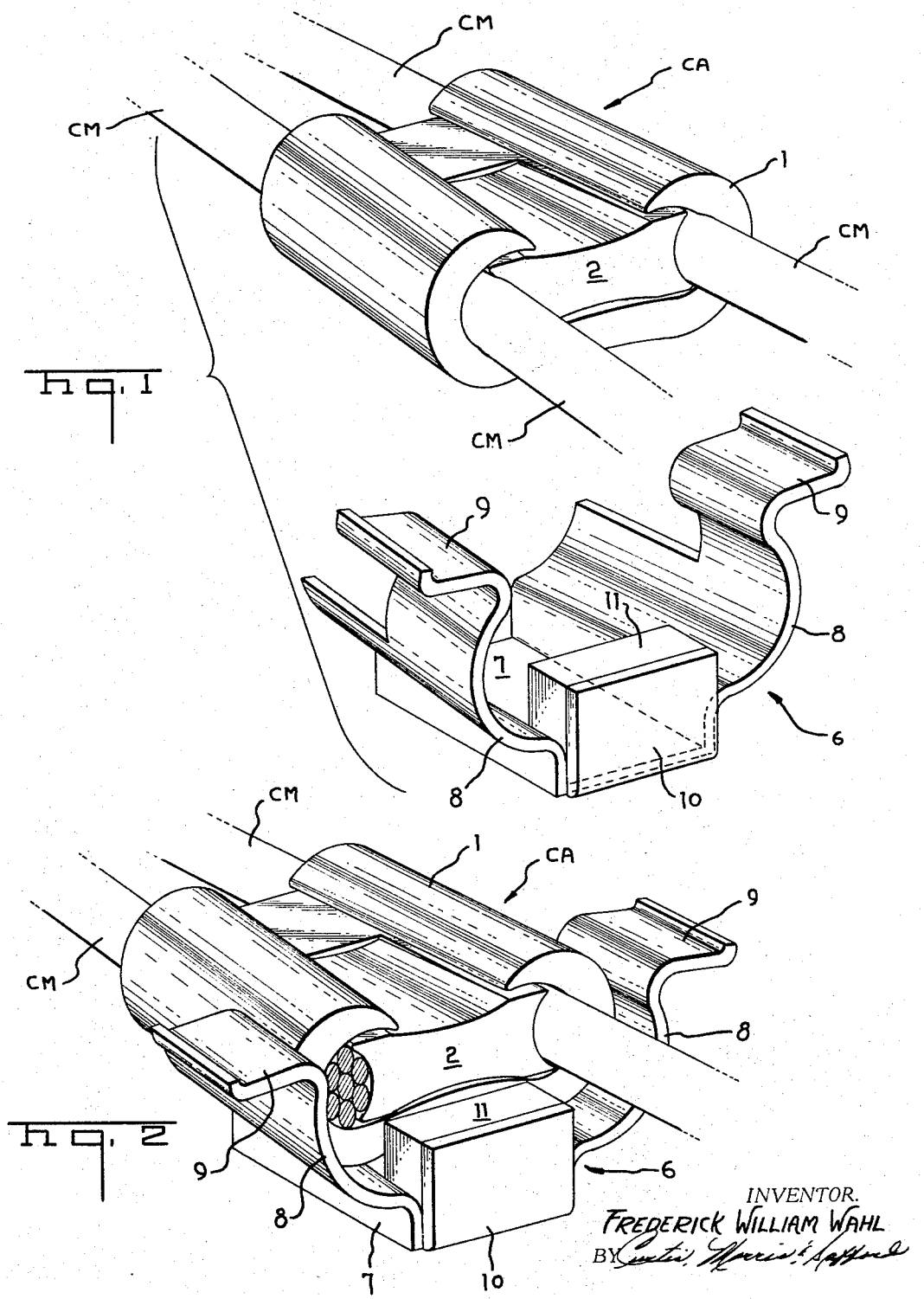

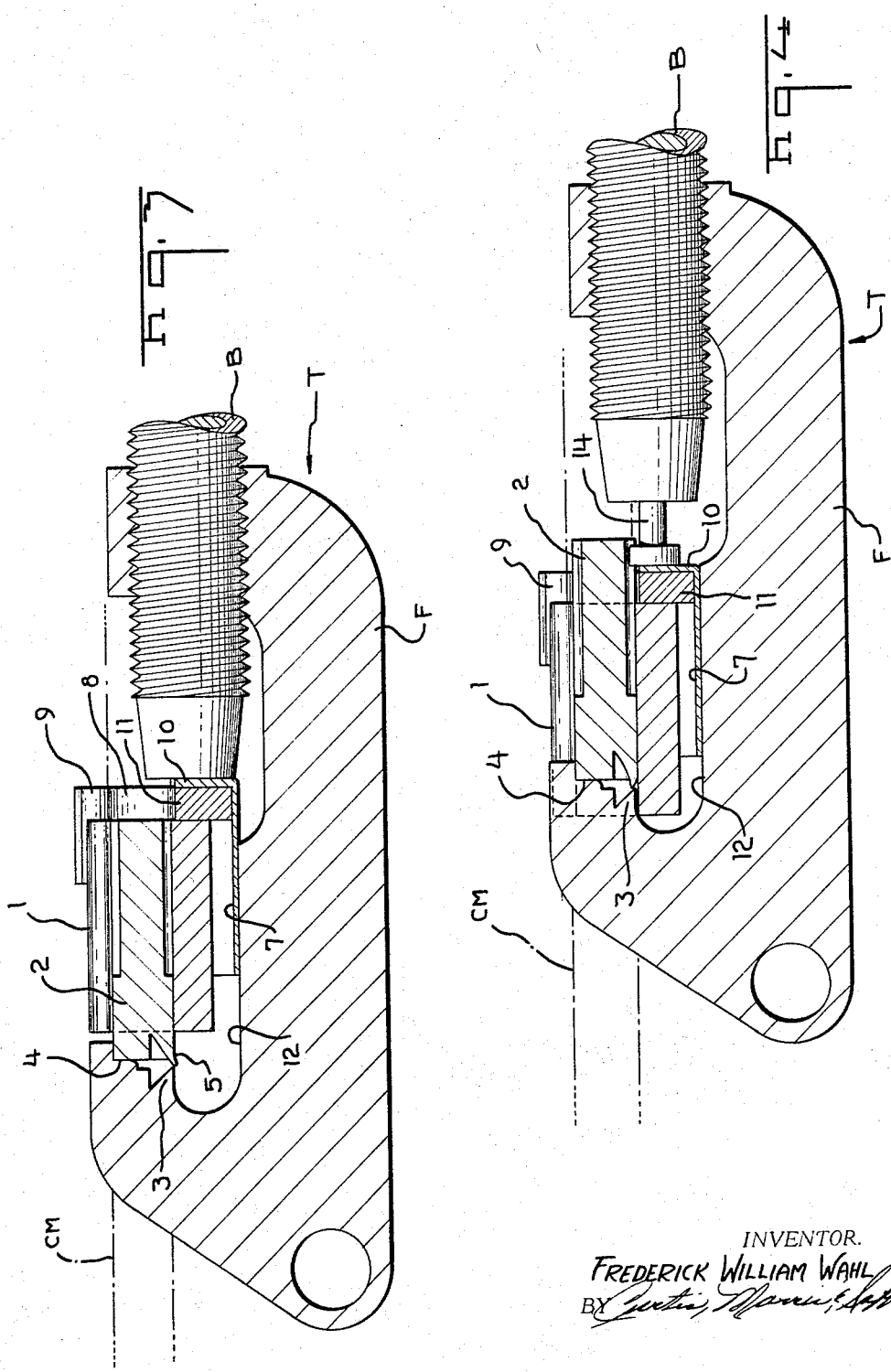

3,279,016
SPRING CLIP MEMBER
Frederick William Wahl, Middletown, Pa., assignor to
AMP Incorporated, Harrisburg, Pa.
Filed Aug. 7, 1964, Ser. No. 388,147
4 Claims. (Cl. 24—126)

This invention relates to a spring clip member and more particularly to a spring clip member or attachment for a C-shaped connector body of a electrical connection assembly.

In U.S. patent application, Serial No. 215,562, now Patent No. 3,212,534, filed August 8, 1962, there is disclosed an explosively-operated tool to drive a wedge member into a C-shaped connector body to effect an excellent mechanical and electrical connection between conductor members. After the connection has been effected, it sometimes becomes necessary to break the connection. Since the connection members are so tightly wedged together, it is extremely difficult to disconect them especially if they have been connected in the manner disclosed in U.S. patent application, Serial No. 341,223, filed January 30, 1964, and assigned to the present assignee.

It is, therefore, a primary object of the present invention to provide a device adapted to be disposed on a connection assembly in order to aid in the disengagement of the frictionally engaged members of the connection assembly.

Another object of the present invention is the provision of a clip member for engagement with frictionally connected members to aid in disconnecting the frictionally connected members.

A further object of the present invention is to provide a spring clip member to be mounted on frictionally connected members and to be inserted in an existing tool to disconnect the frictionally connected members.

An additional object of the present invention is a method to disconnect frictionally connected members.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration and principles thereof and the manner of applying it in practical use so that they may modify it in various forms, each as may be best suited to the conditions of a particular use.

In the drawings:

FIGURE 1 is a perspective exploded view of a connection assembly and a spring clip member;

FIGURE 2 is similar to that of FIGURE 1 with the parts in assembled condition;

FIGURE 3 is a cross-sectional view of a connection assembly with the clip member thereon inserted in an existing tool prior to actuation of the tool; and FIGURE 4 is a view similar to that of FIGURE 3 showing the tool in an operated condition.

Turning now to FIGURES 1 and 2, there is shown a connection assembly CA comprising a C-shaped body member 1 having conductor members CM disposed in the bights thereof and a wedge member 2 frictionally inserted within the connector body and having the sides thereof in engagement with the conductor members. Wedge 2 is preferably driven within connector body 1 by means of a tool T illustrated in FIGURES 3 and 4 and completely disclosed in the above-mentioned application, Serial No. 215,562.

When wedge 2 is driven into connector body 1, the leading part of the wedge is driven against a swaging die 3 located on frame F below an engaging surface 4 which swages a part 5 of the front surface of the wedge downwardly below the bottom inside surface of connector member 1 in order to effect a locking surface to secure wedge member 2 within connector body 1, thereby preventing the wedge member from accidentally working free from the connector body due to vibration or other conditions.

Spring clip member 6 comprises a channel section 7, arcuate sections 8 extending outwardly from the sides of channel section 7 and V-shaped wings 9 extending outwardly from arcuate sections 8. As can be discerned, arcuate sections 8 have a length about one-third the length of the spring clip member. The bottom of channel section 7 has a part 10 extending outwardly therefrom and is bent in a direction normal to channel section 7 toward arcuate sections 8. A block member 11 which has the same configuration as section 10 is affixed thereto as by welding. Block 11 may be secured in channel 7 in engagement with section 10 or secured to both. As can be discerned, block 11 is substantially thicker than section 10. The end of each V-shaped wing 9 has an upwardly-turned portion to aid in grasping these wings in order to move them away from one another. The spring clip member is preferably made of spring steel but may be made of plastic or any other suitable material. If desired, arcuate sections 8 may extend the full length of the spring clip member. If this be the case, then V-shaped wings 9 will be part of arcuate sections 8 except for the portions that extend away from the longitudinal axis of the clip member.

As shown in FIGURE 2, spring clip member 6 is in position on connection assembly CA, and this is accomplished by applying pressure to wings 9 in order to allow connector body 1 to be placed into engagement with arcuate sections 8, and, when the pressure on wings 9 is released, they will also engage connector body 1. The spring characteristic of wings 9 holds connector body 1 within the spring clip member. As can be discerned, block 11 engages the trailing edge of connector body 1. Now that spring clip member has been placed into engagement with connection assembly CA, this combination is now in condition to be placed onto explosively-operated tool T, as illustrated in FIGURE 3.

As shown in FIGURE 3, the leading edge of wedge 2 is placed against engaging section 4 of tool T and channel section 7 engages flat section 12 of this tool. A firing mechanism (not shown) has a barrel 13 threadably disposed within frame F opposite engaging section 4. Barrel 13 is rotated until it engages section 10. Thus, the connection assembly, now disposed within tool T, is ready to be disconnected upon actuation thereof.

Upon actuation of the firing mechanism of tool T, a ram member 14, which is slidably mounted in barrel 13 forcefully engages section 10, thereby driving connector body 1 relative to wedge 2 into the space provided in frame F between die 3 and flat section 12, as illustrated in FIGURE 4. Connection assembly CA is removed from tool T and wedge 2 is readily removed from connector body 1 in order to effect complete disconnection therebetween.

The reason that block 11 is preferably secured to section 10 is to prevent the block from coming loose from the spring clip member which would occur after a small number of uses if block 11 was secured in channel section 7 due to the inertia of block 11 relative to the spring clip member.

As can be discerned, channel section 7 has an adequate height so that when spring clip member 6 rests on flat section 12 of the tool, this enables wedge 2 to be disposed in proper relationship with engaging section 4; however, if a connector body is small, then a platform as disclosed in U.S. patent application, Serial No. 341,282, filed January 30, 1964, and assigned to the present assignee, is disposed on flat section 12 of the tool in order to accommodate the clip member which conforms in size to the connector body.

While ram member 14 has been disclosed as being actuated by the use of an explosive cartridge, it is to be understood that any means that can forcibly drive ram member 14 may be utilized. Block 11 may be eliminated and section 10 may be made longer and bent over into itself at least two or three times in order to provide sufficient strength to withstand the force of the ram member and to drive the connector body relative to wedge 2.

Spring clip member 6 may be formed into shapes other than that disclosed; however, the shape as presently disclosed, has proven the most satisfactory in order to accommodate the various connection assemblies similar to that of connection assembly CA. One form may be the elimination of section 10 with block 11 secured within channel section 7, another form may be the elimination of one or both portions of wings 9 which extends away from the longitudinal axis of the spring clip member. Other suitable forms may, of course, be visualized without departing from the spirit of the invention.

As can be discerned, there has been disclosed a unique and novel spring clip member adapted to be mounted on an electrical connection assembly so that the connection assembly and spring clip member thereon may be disposed within an existing tool in order to effect disconnection between the members of the connection assembly. While the invention has been disclosed in conjunction with an electrical connection assembly, it is to be understood that the spring clip member may be used on any connection assembly of similar nature for any purpose.

It will, therefore, be appreciated that the aforementioned and other desirable objects have been achieved; however, it should be emphasized that the particular embodiment of the invention, which is shown and described herein, is intended as merely illustrative and not as restrictive of the invention.

What is claimed is:

1. A spring clip member for use on a connection assembly having a body member and a wedge member secured therein comprising a bottom section adapted to extend along said body member, resilient side sections extending outwardly from said bottom section for springably engaging the sides of said body member, and an end section connected substantially at an end of said bottom section extending normal thereto for engagement with an edge of said body member, said end section being thicker and stronger thereby forming an impact-receiving section so as to enable it to receive the blows of an impact tool to drive said spring clip member and body member relative to said wedge member to disconnect these members.

2. A spring clip member according to claim 1 wherein at least one of said side sections includes a portion extending outwardly from the longitudinal axis.

3. A spring clip member according to claim 1 wherein said bottom section defines a channel.

4. A spring clip member according to claim 1 wherein V-shaped wings extend outwardly from said side sections.

References Cited by the Examiner
UNITED STATES PATENTS

| | | | |
|---|---|---|---|
| 2,323,758 | 7/1943 | Temple | 60—26.1 X |
| 2,459,503 | 1/1949 | Dahlstrom. | |
| 2,494,881 | 1/1950 | Kost. | |
| 2,749,155 | 6/1956 | Kinghorn | 24—20 X |
| 2,924,809 | 2/1960 | Wilson | 24—259 X |
| 2,958,020 | 10/1960 | Eannarino. | |
| 3,110,873 | 11/1963 | Mittermaier | 24—259 X |

BERNARD A. GELAK, *Primary Examiner.*